United States Patent

Hilliard, Jr.

[15] 3,660,766

[45] May 2, 1972

[54] SINUSOIDAL WAVEFORM GENERATOR

[72] Inventor: Edward J. Hilliard, Jr., Portsmouth, R.I.

[73] Assignee: The United States of America as represented by the Secretary of the Navy

[22] Filed: Apr. 28, 1971

[21] Appl. No.: 138,226

[52] U.S. Cl. ..................................328/14, 307/268, 328/27, 328/61, 328/65

[51] Int. Cl. ..........................................................H03b 19/00

[58] Field of Search ......................328/14, 15, 16, 20, 22, 23, 328/27, 33, 34, 36, 61, 65; 307/261, 268, 271; 324/77 B, 78 D; 333/20

[56] References Cited

UNITED STATES PATENTS

| | | | |
|---|---|---|---|
| 3,051,906 | 8/1962 | Haynes | 328/14 |
| 3,175,160 | 3/1965 | Pintell | 307/261 X |
| 3,181,012 | 4/1965 | Rennie | 328/65 X |
| 3,215,860 | 11/1965 | Neumann | 328/27 X |
| 3,491,282 | 1/1970 | Heinrich et al. | 307/261 X |

*Primary Examiner*—Stanley T. Krawczewicz
*Attorney*—R. S. Sciascia and L. I. Shrago

[57] ABSTRACT

There is disclosed an arrangement for generating sinusoidal waves of low harmonic content and relatively high output level wherein selected square waves of related amplitude and frequency derived from a digital frequency synthesizer are utilized to trigger conventional driving circuits. The outputs of these driving circuits are combined and the complex signal obtained therefrom fed to an integrator which provides the desired signal wave form.

2 Claims, 1 Drawing Figure

PATENTED MAY 2 1972 3,660,766
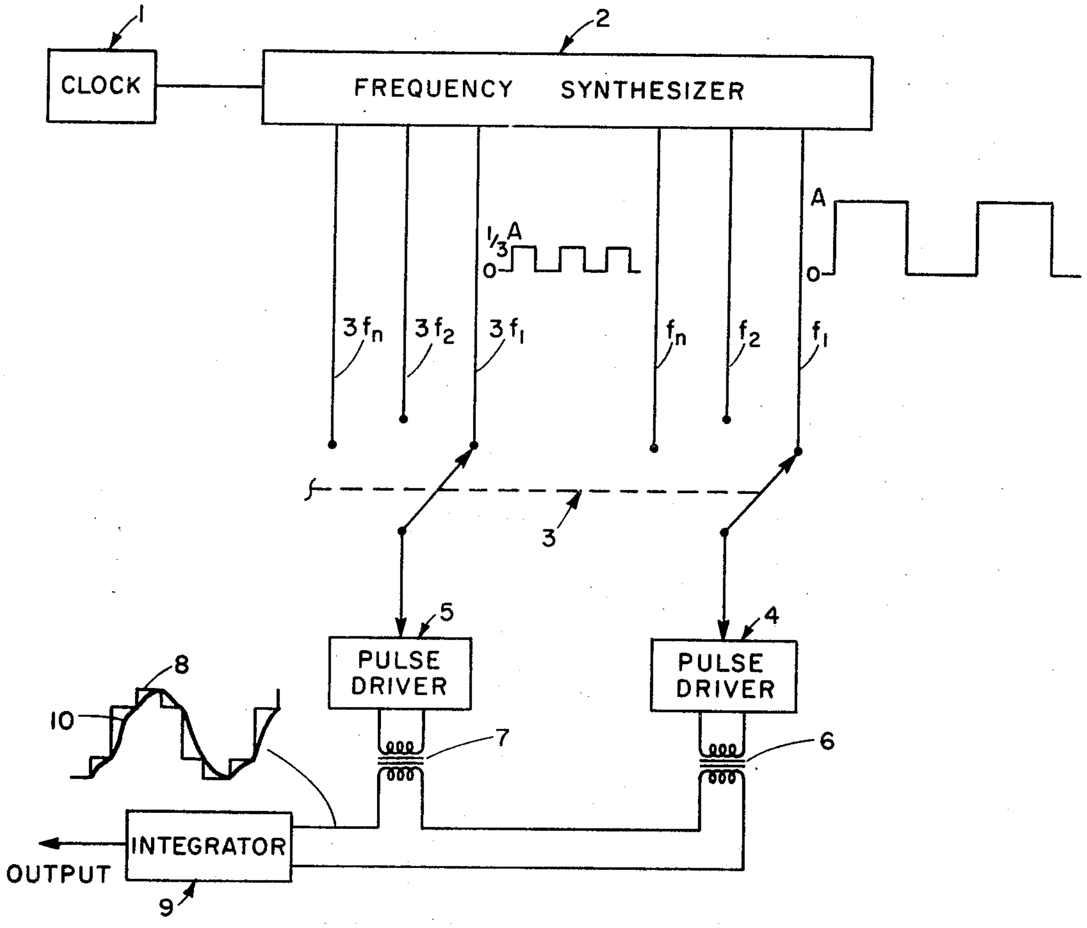
INVENTOR
Edward J. Hilliard, Jr.
BY
Attorney

SINUSOIDAL WAVEFORM GENERATOR

The present invention relates generally to apparatus for and methods of generating signal wave forms of high precision that contain a relatively low harmonic content.

In most communication systems, for example, it is necessary to have available in the system a locally generated signal of high frequency stability and purity. One common arrangement for generating such a signal involves the use of a tuning fork oscillator and a complementary linear power amplifier to achieve an appropriate output power level. Both the tuning fork assembly and the power amplifier are usually relatively expensive and cumbersome devices. Also, the peculiar mode of operation of the tuning fork, which is highly selective, makes it extremely difficult to adapt this system to signals of different frequencies.

Another approach involves the use of crystal-controlled oscillators but here, too, difficulty is encountered when it is desired to change the frequency of these oscillators. Also, the crystal unit must be maintained in a closely regulated temperature environment and sometimes compensating circuits are required to take care of frequency drift due to aging of the crystal.

It is well known that digital frequency synthesizers currently available develop nearly exact square wave forms which possess excellent stability. These characteristics are realized because of the manner in which these square wave signals are, in effect, constructed from pulse wave trains and associated pulse counting networks. With appropriate input signal control, the square waves available from such synthesizers may span a wide portion of the frequency spectrum. It is thus possible to derive from these synthesizers a fundamental square wave and any number of selected harmonics thereof.

The present invention takes advantage of the precision and inherent frequency stability of these square wave forms to fashion a sinusoidal wave form with similar characteristics. More specifically, the technique employed is to combine preselected square waves of related frequencies and related amplitudes to initially form a complex wave form which, when subsequently integrated, yields a very pure, sinusoidal wave form. The frequency of the resultant sinusoidal wave form corresponds to the fundamental square wave involved in the process. For example, it can be shown that mere addition of two square waves, such as a fundamental and a third harmonic thereof adjusted to have its amplitude equal to one-third of that of the fundamental, will result in a complex wave form wherein the harmonics corresponding to the sine terms of the third, ninth and 15th harmonics are eliminated but with the fundamental fifth, seventh, 11th, 13th retained.

In order to provide a sinusoidal wave form of sufficient output power level, the individual square waves selected from the digital frequency synthesizer are utilized to trigger conventional driving circuits which may be of relatively simple and reliable design. Since these driving circuits are, in effect, on-off devices, they need not be of complex construction, unlike the linear power amplifiers required in the tuning fork oscillators mentioned above.

The individual output signals from the various drivers, it will be appreciated, still contain a high harmonic content and, as indicated hereinbefore, this attribute of the signals is effectively eliminated by the subsequent combining of these square waves in an additive fashion.

In this respect, the following simplified treatment illustrates how the proper algebraic addition of preselected square waves of appropriate frequency and amplitude will yield a sinusoidal wave form having any desired degree of purity as indicated by the absence therefrom of numerous harmonics.

1. If $\Phi_i(t)$ by definition is a square wave of frequency $if_o$ and of amplitude $1/i$,
2. Then, according to this notation $\Phi_1(t)$ is a square wave of amplitude 1 and frequency $f_o$;
3. $\Phi_3(t)$ is a square wave of amplitude 1/3 and frequency $3f_o$;
4. $\Phi_5(t)$ is a square wave of amplitude 1/5 and frequency $5f_o$; and etc.

A simple Fourier treatment shows the following:

(5) $$\Phi_1(t)=\frac{4}{\pi}\sum_{n\ \mathrm{odd}}^{\infty}\frac{1}{n}\sin 2n\pi f_0 t$$

or (6) $$\frac{4}{\pi}\sum_{n\ \mathrm{odd}}^{\infty}\frac{1}{n}\sin nw_0 t \text{ where } w_0=2\pi f_0$$

(7) $$\Phi_3(t)=\frac{4}{3\pi}\sum_{n\ \mathrm{odd}}^{\infty}\frac{1}{n}\sin 3nw_0 t$$

(8) $$\Phi_5(t)=\frac{4}{5\pi}\sum_{n\ \mathrm{odd}}^{\infty}\frac{1}{n}\sin 5nw_0 t$$

etc.

By simple expansion and addition, it is readily shown (as a specific example)

$$\Phi_1(t)-\Phi_3(t)-\Phi_5(t)-\Phi_7(t)-\Phi_{11}(t)-\Phi_{13}(t)+\Phi_{15}(t)=(4/\pi)\sin w_o t \text{ plus} \quad (9)$$

only terms in odd frequencies of $17w_o$ and higher.

It is accordingly a primary object of the present invention to provide a method for generating a sinusoidal signal with a relatively low harmonic content which utilizes digital processing techniques.

Another object of the present invention is to provide a voltage wave form of high frequency stability and purity which involves the digital production of square waves and the summation of these waves to eliminate unwanted harmonics from the resultant wave form.

Another object of the present invention is to provide an arrangement for generating highly stabilized sinusoidal signals wherein pulse drivers are utilized to achieve an appropriate output power level.

Other objects, advantages and novel features of the invention will become apparent from the following detailed description of the invention when considered in conjunction with the accompanying drawing, the single FIGURE of which illustrates in a simplified form one arrangement for producing a sinusoidal wave form of the desired stability and purity.

As will be seen, pulses from a clock source 1 are fed to a digital frequency synthesizer 2 to produce at the output side of this synthesizer a fundamental $f_1$ of amplitude A and a third harmonic thereof $3f_1$ of amplitude A/3. Depending upon the manner of operation of synthesizer 2, there may also be available at the output side of this circuit a wide variety of different frequencies, such as $f_2$ to $f_n$ and $3f_2$ to $3f_n$.

In the particular case selected for illustration, the fundamental square wave $f_1$ and its third harmonic $3f_1$ are selected and fed through switch 3 to separate pulse drivers 4 and 5. These pulse drivers, as indicated above, are merely on-off devices which preserve the precise wave forms of the square waves while increasing their power level. However, the amplitude of the signals appearing in their output circuits still retain their relative input amplitude relationship. Thus, the signal appearing in the output of pulse driver 5 still is one-third the amplitude of the signal appearing in the output of pulse driver 4. Each pulse driver feeds a transformer, such as 6 and 7, and the output circuits of these transformers are interconnected in an additive manner. The complex signal resulting from this combining operation, shown by the stepped wave form 8, is fed to an integrator 9 to produce the generally sinusoidal wave form 10 having the sine terms of the third, ninth and 15th harmonics of $f_1$ eliminated.

It would be appreciated that associated with the frequency synthesizer 2, or forming part thereof, are appropriate synchronizing circuits, not shown, for insuring the proper phase relationship between the fundamental square wave and all harmonics used in the process.

It will also be appreciated that where it is desired, for example, to generate sinusoidal signals of a different frequency, switching device 3 may be operated to, for example, feed a different frequency fundamental $f_2$ and its third harmonic $3f_2$ to the pulse drivers. Likewise, while only the fundamental and third harmonic are shown, the system can be extended to include higher orders of odd harmonics, in which case, of course, additional switching arms should be added to switch 3 plus an appropriate number of pulse drivers connected in the manner shown. The degree of signal purity desired, of course, determines how complex a system is needed. For a signal of even greater purity, it will be appreciated, the fifth harmonic $5f_1$ may be included in the signal addition process. This fifth harmonic would have an amplitude one-fifth that of the fundamental.

What is claimed is:

1. Apparatus for generating a sinusoidal wave form of a predetermined frequency which have a relatively low harmonic content, comprising a digital frequency synthesizer, said synthesizer having a multiplicity of output circuits where a square wave of a fundamental frequency related to said sinusoidal wave form and where additional square waves corresponding to odd harmonics of said fundamental appear with the amplitude of each square wave being inversely proportional to the frequency thereof;

a multiplicity of driving circuits;

means for coupling said square waves to the inputs of said driver circuits;

a like multiplicity of transformers;

means for coupling the primary of each transformer to the output of a different driving circuit;

means for interconnecting all of the secondaries of said transformer in a series circuit; and an integrator connected across said series circuit thereby to develop said sinusoidal wave form.

2. Apparatus for generating a sinusoidal wave form of low harmonic content comprising, in combination, a source of clock pulses;

a digital frequency synthesizer having a first plurality of output circuits at which square wave signals of fundamental frequencies $f_1$, $f_2$, . . . $f_n$ are produced, a second plurality of output circuits at which square wave signals of the third harmonics $3f_1$, $3f_2$, . . . $3f_n$ are produced, and a third plurality of output circuits at which square wave signals of the fifth harmonics $5f_1$, $5f_2$, . . . $5f_n$ are produced in response to clock pulses fed to the input of said frequency synthesizer with the amplitude of the third and fifth harmonic signals being one-third and one-fifth that of the fundamental, respectively;

means for feeding said clock pulses to the input of said frequency synthesizer, thereby to produce said square waves of said fundamental, third and fifth harmonics;

a pulse driver for each plurality of output circuits having an input and output circuit;

means for coupling a square wave of a selected fundamental frequency and the square waves of the corresponding third and fifth harmonics to the input circuit of a different pulse driver;

a transformer for each pulse driver;

means for coupling the primary of each transformer to the output circuit of a different pulse driver;

means for interconnecting all of the secondaries of said transformers in an additive series circuit; and an integrator connected across said series circuit thereby to develop said sinusoidal wave form.

* * * * *